United States Patent
Sanford

[15] 3,665,506
[45] May 23, 1972

[54] ELECTRICAL APPARATUS AND GAGING DEVICE USING SAME

[72] Inventor: Norman R. Sanford, Dayton, Ohio

[73] Assignee: The Bendix Corporation

[22] Filed: Feb. 4, 1970

[21] Appl. No.: 8,571

[52] U.S. Cl. ........................................324/103 P, 324/111
[51] Int. Cl. ........................................G01r 19/16, G01r 1/00
[58] Field of Search ...............324/103 P, 103, 111; 328/151; 307/235, 238

[56] References Cited

UNITED STATES PATENTS

| | | | |
|---|---|---|---|
| 2,953,746 | 9/1960 | Benewicz | 324/103 P |
| 3,259,760 | 7/1966 | Morey et al. | 324/103 X |
| 2,979,663 | 4/1961 | Gill et al. | 324/103 P |
| 3,529,249 | 9/1970 | Jasper et al. | 324/130 |

*Primary Examiner*—Rudolph V. Rolinec
*Assistant Examiner*—Ernest F. Karlsen
*Attorney*—Candor, Candor & Tassone, William F. Thornton and Plante, Hartz, Smith & Thompson

[57] ABSTRACT

An electrical apparatus and gaging device using same wherein an electrical input signal is improved in quality and useability to provide a precision electrical output signal through the cooperating arrangement of an amplifier, a capacitor, and a pair of charging devices, wherein the first device of the pair is operatively connected between the output terminal of the amplifier and the output connection of the capacitor and allows only negative charging of the capacitor and the second device of such pair is operatively connected between such output terminal and output connection and allows only positive charging of the capacitor. One of the devices is energized for a predetermined short time interval and the other of the devices is energized for a substantially unlimited time interval with the devices cooperating with the amplifier during the predetermined time interval causing the voltage level at the output connection to be equal in magnitude to the voltage level of the input signal to define an initial voltage condition. The other charging device then cooperates with the amplifier to change the voltage level at the output connection only in one direction from its initial condition in direct proportion to the input signal and thereby provide the precision output signal at great speed and substantially without decay.

16 Claims, 3 Drawing Figures

INVENTOR.
NORMAN R. SANFORD

BY
Candor, Candor & Tassone

ATTORNEYS

INVENTOR.
NORMAN R. SANFORD

BY
Candor, Candor & Tassone

ATTORNEYS

ELECTRICAL APPARATUS AND GAGING DEVICE USING SAME

BACKGROUND OF THE INVENTION

Many current machines make extensive use of electrical energy to accomplish numerous control functions, and the like. In the case of a gaging device, for example, it has been found advantageous to provide an electrical apparatus which stores and uses the extremes of voltage signals to determine product characteristics. However, electrical apparatus of this general character proposed heretofore are comparatively unreliable, introduce voltage drops which substantially degrade the input voltage signal, and are comparatively slow in providing a useable output voltage signal.

SUMMARY

This invention provides a solid state electrical apparatus and gaging device using same wherein an electrical input signal is improved in quality and useability to provide a precision electrical output signal through the cooperating arrangement of an amplifier, a voltage level storage means, and a pair of charging devices. The first device of such pair is operatively connected between the output terminal of the amplifier and the output connection of the storage means and allows only negative charging of the storage means and the second device of such pair is operatively connected between such output terminal and output connection and allows only positive charging of the storage means. One of the devices is energized for a predetermined short time interval and the other of the devices is energized for a substantially unlimited time interval with the devices cooperating with the amplifier during the predetermined time interval causing the voltage level at the output connection to be equal in magnitude to the voltage level of the input signal to define an initial voltage condition. The other charging device then cooperates with the amplifier to change the voltage level at the output connection only in one direction from its initial condition in direct proportion to the input signal and thereby provide the precision output signal at great speed and substantially without decay.

Other details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention, in which.

DESCRIPTION OF ILLUSTRATED EMBODIMENT

Figures 1, 2:
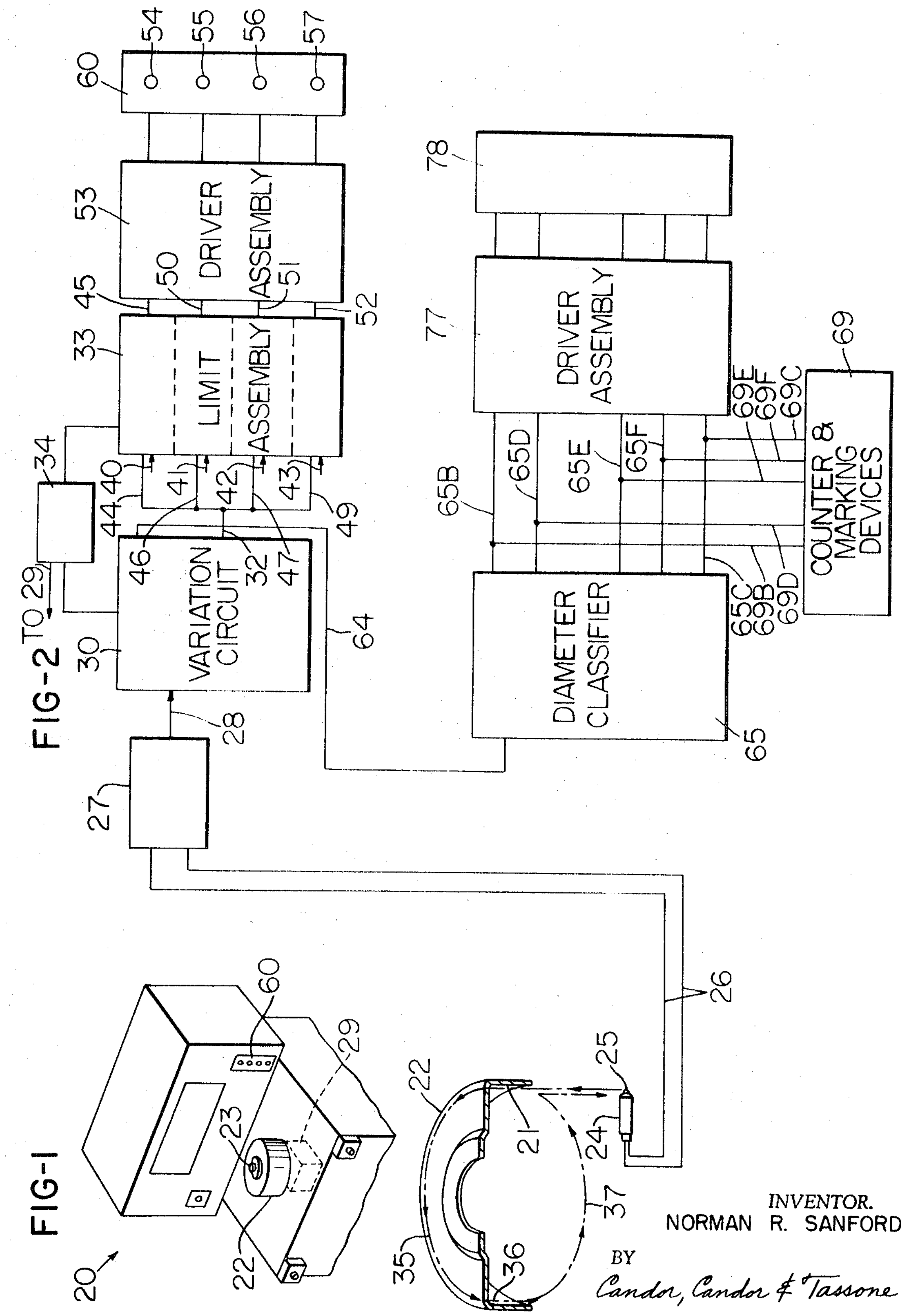
FIG. 1 is a fragmentary perspective view illustrating an exemplary gaging device utilized to check the inside cylindrical surface of a brake drum of the type used on an automobile and such device utilizes one embodiment of the improved electrical apparatus of this invention.
FIG. 2 illustrates a fragmentary portion of an exemplary brake drum which is installed on the gaging device of FIG. 1 together with an associated gage head and electrical circuitry which includes the electrical apparatus of this invention wherein such circuitry is utilized to determine out-of-round conditions, taper, and classify the diameters of a plurality of brake drums tested by the gaging device of FIG. 1.

Reference is now made to FIG. 1 of the drawings which illustrates an exemplary gaging device 20 which utilizes one exemplary embodiment of the electrical apparatus of this invention. The gaging device 20 is utilized to check the inside cylindrical surface 21 of a brake drum 22 for out-of-roundness and for taper and comprises a rotatable spindle 23 which supports and rotates the brake drum 22 about a vertical central axis through the spindle.

The gaging device 20 also has a gage head 24, see FIG. 2, which has a contact probe unit 25 which is fixed at the terminal end of a core which moves with respect to windings of a precision differential transformer provided within the gage head 24 to provide a gaging signal through a pair of lines 26 to a signal demodulator and amplifier assembly 27 which provides a D.C. output signal from the assembly 27 through a line 28. The core of such transformer is normally urged outwardly to thereby urge and hold the probe against the inside surface 21 of the brake drum 22 and as the brake drum 22 is rotated by its spindle 23 any out-of-round condition of the inside surface 21 with respect to a reference condition or reference radius will cause movement of the probe 25 and hence provision of corresponding signals from the gage head 24 to the assembly 27 which amplifies such signals.

The gage head 24 is supported on the gaging device so that its probe 25 is in close proximity to the inside surface 21. In addition, suitable means is provided to move the gage head 24 vertically to enable checking the cylindrical surface 21 at a plurality of positions along its vertical height.

The gaging signals from the assembly 27 may be provided as direct current (D.C.) analog signals in the form of positive and negative signals through a line 28 to one exemplary embodiment of the control apparatus of this invention which will also be referred to as a variation circuit 30 which provides a precision variation output signal therefrom through a line 32. The variation signal is transmitted through line 32 to a limit assembly 33 which will be described in detail subsequently.

The gaging device 20 has a sequencing device or controller 34 which is operatively connected to the variation circuit 30, the limit assembly 33, and the controls and drives, indicated at 29 in FIG. 1, for the gage head 24 and spindle 23. The controller provides automatic sequencing in a manner well known in the art to enable automatic inspection of the inside surface 21 of drum 22.

In this example of the invention the controller 34 causes the gage head 24 to move so that its probe 25 engages the innermost portion of the inside surface 21 of the brake drum 22 and this engagement takes place through an arc of 180° as indicated at 35, followed by traversing movement of the gage head 24 vertically as indicated at 36, and then engagement of the outer portion of the inside surface through an arc of 180° as indicated at 37. The movement through arcs 35 and 37 in this example of the invention is provided by rotating the spindle 23 and drum 22 with the gage head 24 kept stationary; however, in some applications of this invention it may be preferred to rotate the gage head as well as move it vertically to provide the necessary gaging.

The limit assembly has a plurality of reference voltages indicated at 40, 41, 42, and 43 and each reference voltage is representative of a voltage above or below which an input voltage through the associated portion of the limit assembly will be in excess of acceptable limits. In particular, it will be seen that the sequencing device 34 causes an output signal provided through a line 44 to be compared with the reference voltage 40 to indicate out-of-round of the inner portion of cylindrical surface 21 and this is achieved during engagement of the contact probe 25 with the inner surface through the 180° arc indicated at 35. Once this signal has been compared with the reference voltage a corresponding output signal will be provided out of the limit assembly 33 through a line 45.

The sequencing device 34 then provides signals through either lines 46 or 47 during movement of the gage head 24 through the vertical path 36 and the signals through lines 46 or 47 are compared with the reference voltages 41 and 42 respectively to give an indication of either positive taper or negative taper and provide an output signal either through line 50 or 51 respectively. A positive or plus taper indicates outward flaring of cylindrical surface 21 while a negative or minus taper indicates a converging of such surface outwardly, i.e., the largest diameter portion represents the innermost portion.

The sequencing device 34 then provides a comparison of the variation signal provided through a line 49 with the reference voltage 43 to indicate whether the outer portion of the inside surface 21 is out-of-round to provide a corresponding output signal through the line 52.

Each signal 45, 50, 51, and 52 is introduced into a driver assembly 53 which operates to trigger a higher voltage source causing the provision of the signal at a higher energy level which is sufficient to operate lights 54, 55, 56, and 57 on a panel 60 and these lights respectively indicate that the innermost diameter is out-of-round, there is an unacceptable plus taper on the drum, there is an unacceptable minus taper on the drum, and the outermost diameter is out-of-round.

Figure 3:
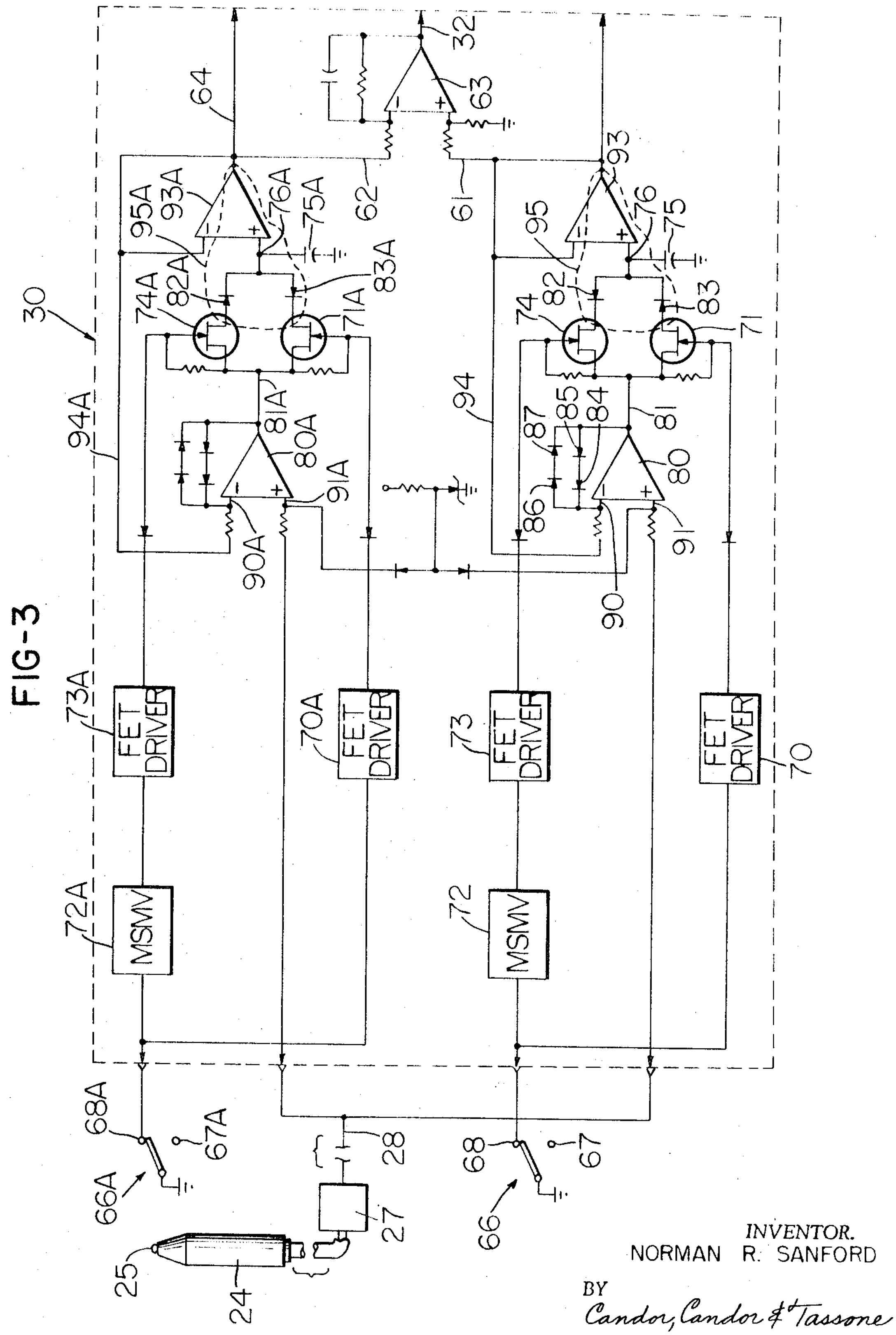
FIG. 3 is a detailed schematic illustration of the electrical apparatus of this invention operatively connected to the gage head comprising the gaging device of FIG. 1.

As seen in FIG. 3 the variation output signal provided through line 32 is comprised of a positive signal provided through a line 61 and a negative output signal provided through a line 62 which are combined in a known manner through a differential amplifier 63. The variation output signal provided through line 32 is used to control the operation of lights 54–57 on panel 60 in this example; however, it will be appreciated that either the negative or positive signal provided through lines 62 and 61 respectively may be utilized alone to accomplish certain gaging functions and to highlight this fact the negative signal provided through line 62 may, if desired, be provided through a line 64, see FIG. 2, to a diameter classifier 65.

The classifier 65 classifies brake drums 22 inspected on the gaging device 20 as to minimum diameter irrespective of whether the measurement occurred at the innermost portion of the inside surface 21 or the outermost portion of such surface as measured along paths 35 and 37 respectively to indicate, based on the magnitude of each signal, whether the inside diameter is oversize causing a signal to be provided through a line 65B, undersize causing a signal to be provided through a line 65C, or a plurality of intermediate sizes causing signals to be provided through lines 65D, 65E, or 65F.

The signals through lines 65B-F may be provided to suitable counters and marking devices indicated generally at 69 through associated lines 69B, 69C, 69D, 69E and 69F to provide identification marks on each brake drum based on the size of its inside diameter utilizing suitable identification equipment and in a manner well known in the art. In addition, the signals through lines 65B-F may be suitably amplified in a driver assembly 77 to trigger proper higher voltage sources and provide readout of the diameter on a permanent record apparatus, or the like, as indicated at 78.

Reference is now made to FIG. 3 of the drawings which illustrates the improved electrical apparatus or circuit 30 of this invention. The circuit illustrated in FIG. 3 is comprised of two portions, one portion is utilized for that portion of an input signal which is positive and the other portion is utilized for that portion of an input signal which is negative. The detailed description will proceed analyzing only a positive input or gaging signal and associated components in detail; however, it is to be understood that the operation of the circuit in connection with a negative input signal is substantially identical with one minor exception which will be explained subsequently.

Once a brake drum 22 has been placed on the gaging device 20 and the gage head 24 brought into contact therewith, the sequencing device 34 causes a switch 66 to be energized so that a pivoted contractor thereof moves from a normally open pin 67 into contact with a contact 68. This causes power to be supplied through a field effect transistor driver 70 to turn on or energize a field effect transistor 71. Simultaneously with the energizing of the field effect transistor 71 power is supplied through a monostable multivibrator unit 72 to another field effect transistor driver 73 which in turn energizes a second field effect transistor 74. The field effect transistor 74 is energized for a predetermined short time interval as determined by the monostable multivibrator unit 72.

The electrical apparatus has a voltage level storage means in the form of a capacitor 75 which may be of any known construction or electrical value and has an output connection indicated at 76. The capacitor 75 exhibits properties of high internal resistance and has a low dielectric absorption coefficient thereby assuring provision of an output signal of optimum quality and the manner in which such signal is provided will now be described in detail.

The positive portion of the amplified analog signal from the gage head 24 is provided through line 28 to an amplifier which is preferably an operational emplifier 80. The operational amplifier 80 cooperates with the capacitor 75 to assure the provision of an output signal through connection 76 which is of optimum quality.

The operational amplifier 80 has an output terminal 81 and it will be seen that the field effect transistor 74 is operatively connected between such output terminal 81 and the output connection 76 of the capacitor 75 and has a diode 82 associating therewith which allows only negative charging, i.e., discharging, of the capacitor 75. The field effect transistor 71 is operatively connected between the output terminal 81 and the output connection 76 and has a diode 83 associating therewith and allows only positive charging of the capacitor 75.

Feedback means is provided for the amplifier 80 and comprises a pair of sets of diodes with one set being comprised of diodes 84 and 85 and the other set being comprised of diodes 86 and 87. The two sets of diodes are arranged in parallel and the individual diodes 84 and 85 are arranged in series with the diodes 86 and 87 also being arranged in series. The diodes 84–87 are operatively connected to the output terminal 81 and to an inlet terminal 90 of the operational amplifier 80.

When both the field effect transistors 71 and 74 are energized the capacitor 75 will be charged either positively or negatively to the value of the input signal provided through line 28 to an input terminal 91 of the amplifier 80. This is achieved because the field effect transistors 71 and 74 are operating simultaneously with the transistor 74 being operated for only an initial predetermined time interval as determined by the multivibrator unit 72. During this initial predetermined period that the transistor 74 is energized the capacitor 75 is charged either positively or negatively (depending upon its initial potential) so that the energy level at its output connection 76 is the same as the level of the signal provided through the line 28. Once the energy level at the output connection 76 equals the energy level of the signal through line 28 the circuit is considered as being initialized or being at an initial voltage condition.

To further explain how the circuit operates to provide this initial voltage condition, assume that the input through line 28 is more positive than the stored voltage of the capacitor 75. Then, the positive terminal 91 of the amplifier 80 is also at substantially the same voltage as the input signal through line 28; in addition, output connection 76 is operatively connected to the negative terminal of amplifier 80 to provide a means of comparison of the potential of capacitor 75 and the input voltage through line 28. The four diodes 84–87 provide negative feedback to the amplifier 80 and the normal operation of the amplifier 80 with such negative feedback is such that the voltage difference between its positive and negative terminals goes to zero, thereby limiting the output of amplifier 80 through line 81 to within a few volts of the input through line 28. During this period the capacitor 75 is charged to the more positive value causing its energy level at point 76 to equal the input level through line 28. Conversely, if the energy level through line 28 is less positive or less than the stored value of the capacitor 75 then it charges negatively during the predetermined time interval causing its energy level at point 76 to equal the energy level of the signal at point 90 and the operation of amplifier 80 is such that the voltage difference between points 90 and 91 goes to zero whereby the level of the signal at point or connection 76 equals the level through line 28.

Thus, it is seen that the output of the amplifier 80 is positive when the input signal through line 28 is more than the stored voltage of capacitor 75 and negative when the input signal through line 28 is less than the stored voltage on the capacitor 75.

After providing the output connection 76 with a stabilized initial voltage condition, and after the end of the short predetermined time interval, the capacitor 75 will be charged only more positively because of the action of the diode 83 and for as long a period as the field effect transistor 71 is on or energized. The capacitor cannot under any condition be charged more negatively. In particular, if the transistor 71 if off or deenergized nothing can happen to adversely effect the capacitor 75 and likewise if the output of the operational amplifier 80 is negative and less than the value of the capacitor 75 nothing adverse can happen thereto. The result is that the amplifier 80, field effect transistor 71, and diode 83 cooperate to charge capacitor 75 to the most positive input or value which exists during the time that the transistor is on.

Thus, when the control device 34 causes the pivoted contactor of switch 66 to move to its open pin 67, the field effect transistor 71 is turned off and no further charging of the capacitor 75 is possible whereupon the capacitor 75 stores the most positive input or extreme detected during the time that the transistor 71 was energized.

The upper portion of the circuit illustrated in FIG. 3 operates in a similar manner as the lower portion of such circuit and deals only with the negative excursions of the signal from the stabilized initial voltage condition. The upper portion utilizes substantially identical components as the lower portion and these components will be identified by the same reference numerals as in the lower portion of FIG. 3, followed by the reference numeral A and not described again in detail.

The main difference between the upper portion of the circuit of FIG. 3 and the lower portion of such circuit is that during initialization the field effect transistor 74A allows positive charging of the capacitor 75A rather than negative charging as in the case of transistor 74 for a predetermined short time interval determined by its monostable multivibrator 72A. Following such initialization the field effect transistor 71A allows unlimited negative charging, rather than unlimited positive charging as provided by transistor 71. Thus, once the transistor 74A is deenergized as determined by the monostable multivibrator unit 72A, then any further charging action with respect to the capacitor 75A merely operates to provide negative charging of the capacitor 75A through the transistor 71A whereby the capacitor 75A operates to store the most negative input detected.

From the above explanation it is apparent that the circuit provided in the upper portion of FIG. 3 of the drawings detects and stores in capacitor 75A the most negative extreme of the amplified negative signal provided from the gage head 24 through line 28 and the circuit in the lower portion of FIG. 3 detects and stores in capacitor 75 the most positive extreme of the amplified positive signal provided from the gage head 24 through line 28. In each instance, irrespective of whether only a negative signal or only a positive signal is being utilized the cooperating arrangement of components is such that a precision useable output signal is provided at great speed and substantially without decay.

The capacitors 75 and 75A provide output signals at their output connections 76 and 76A respectively with great accuracy and in some applications it may be desired to use these signals, which may be considered intermediate signals, as provided. However, it has been found that the quality of the output signal at each point 76 and 76A may be improved in a manner now to be described for only the positive signals provided through line 28 and in connection with the lower portion of the circuit of FIG. 3. Substantially identical components are utilized in the upper portion of the circuit of FIG. 3 and as previously these components will be given identical reference numerals as corresponding components in the lower portion again followed by the reference letter A.

In particular, it will be seen that another operational amplifier 93 is provided and has its positive input terminal connected to the output connection 76 and has a feedback line 94 from its negative terminal to the input terminal 90 of the operational amplifier 80. The amplifier 93 has a high input impedance which prevents discharge of the capacitor 75 and the amplifier 93 is utilized to increase the energy level of the output signal provided at output connection 76 while keeping the precision character thereof substantially intact. The final precision positive output signal is provided through line 61 from the operational amplifier 93 and supplied to the differential amplifier 63.

The upper portion of the circuit of FIG. 3 has an operational amplifier 93A which has a feedback line 94A to the input terminal 90A of its operational amplifier 80A and the operation of the amplifier 93A and characteristics thereof are similar to the amplifier 93. The output from the amplifier 93A is provided through a line 62, as previously mentioned, to the differential amplifier 63 so as to provide a signal from such differential amplifier through the line 32 which has been referred to a the variation signal or the signal representing the difference between the most positive peak and the most negative peak. The variation signal may be used in any suitable manner and in this example is used in the manner described in connection with FIG. 2 of the drawings.

Each capacitor 75 and 75A is provided with a suitable guard band 95 and 95A respectively about its associated output connection 76 and 76A. Each guard band is operatively connected to the output terminal of its operational amplifier (93 or 93A) and is effective in maintaining the potential around the output connection of its capacitor at the same level as the output connection itself. The guard band thus prevents leakage from its capacitor to surrounding components and voltage levels.

In short, it is seen that each guard band is driven by the output of an associated amplifier 93 or 93A respectively in a voltage follower configuration and in essence monitors the stored voltage of its respective capacitor 75 or 75A. The guard band greatly reduces the amount of care which must be exercised in assembly of components such as assembly of components in a printed circuit board, for example, and enables the control apparatus 30 to be handled with only a routine amount of care and precaution during production while assuring the provision of a precision output signal.

The unique electrical apparatus of this invention provides superior performance in that it does not require that a precharging cycle be provided and has an initial response of generally of the order of 3 milliseconds. Further, the initialization cycle time, i.e., the time required to bring the output connection of each capacitor to the level of its associated input signal whether it be positive or negative is generally of the order of 5 milliseconds.

In some applications of this invention it may not be desirable to provide both a positive and negative peak detector and storage means because either a positive or a negative peak detector will suffice. To highlight this fact, it will be seen that the diameter classifier 65 illustrated in FIG. 2 utilizes only the negative signal provided through the line 64 and it would not be necessary to provide the remainder of the circuit in such an application concerned merely with classification of minimum diameters.

In this example of the invention, the various power sources for the components of the electrical apparatus of FIG. 3 have not been illustrated; however, it will be appreciated that suitable power sources will be provided as required and in a manner well known in the art.

The electrical apparatus is illustrated as being used in connection with a gaging device 20 used to provide dimensional measurements. However, it will be appreciated that such gaging device need not necessarily be of the type used to provide only dimensional measurements but may be utilized to determine any desired product characteristic. Further, even though the gage head 24 has a contact probe 25 which engages the workpiece or brake drum 22, it is to be understood that a gage head may be employed which utilizes a non-contact type probe which provides a gaging signal as a function of the proximity thereof to an associated workpiece, or the like.

The improved electrical apparatus of this invention may also be utilized in other types of machines and is not necessarily limited to gaging devices or machines. For example, the electrical apparatus may be used to control machine tools of all types, assembly machines, machines for applying or depositing coating means on associated workpieces, etc.

While present exemplary embodiments of this invention have been illustrated and described, it will be recognized that this invention may be otherwise variously embodied and practiced within the scope of the following claims.

What is claimed is:

1. An electrical apparatus for improving the quality of an input signal which has an initial potential voltage which may vary in sign and magnitude to provide a precision electrical output signal, said apparatus comprising, voltage level storage means having an output connection which provides said output signal, an amplifier having said input signal supplied thereto and having an output terminal, a first device operatively connected between said output terminal and said output connection and providing only negative charging of said storage means, a second device operatively connected between said output terminal and said output connection and providing only positive charging of said storage means, one of said devices being energized for a predetermined time interval and the other of said devices being energized for a substantially unlimited time interval, said devices being operatively connected within a closed negative feedback loop comprising said amplifier, said devices, and said voltage level storage means together with its output connection, said devices cooperating with said amplifier during said predetermined time interval causing the voltage level at said output connection to be equal to the voltage level of said input signal to define an initial voltage condition which is equal in sign and magnitude to said initial potential voltage regardless of its sign and magnitude, said other device cooperating with said amplifier to change the voltage level at said output connection only in one direction from said initial condition in direct proportion to said input signal, said apparatus operating to provide said precision output signal at great speed because it always begins operation at the voltage level of said initial potential voltage, and said apparatus operating to store said signal substantially without decay.

2. An apparatus as set forth in claim 1 in which said amplifier comprises an operational amplifier and has variable gain feedback means operatively connected between said output terminal and an input terminal thereof.

3. An apparatus as set forth in claim 2 in which said feedback means comprises two sets of diodes connected in parallel and each set comprises a plurality of diodes connected in series.

4. An apparatus as set forth in claim 1 in which said voltage level storage means comprises a capacitor exhibiting properties of high internal resistance and a low dielectric absorption coefficient.

5. An apparatus as set forth in claim 1 and further comprising another amplifier operatively connected between said output connection and said first-named amplifier, said other amplifier having a high input impedance which prevents discharge of said voltage level storage means, said other amplifier increasing the energy level of said output signal while keeping the precision character thereof substantially intact.

6. An apparatus as set forth in claim 1 in which each of said devices comprises a field effect transistor.

7. An apparatus as set forth in claim 6 in which said other charging device comprises a charging diode connected between said output connection and said output terminal to assure said voltage level is changed only in said one direction.

8. An apparatus as set forth in claim 1 and further comprising a guard band surrounding said output connection and means maintaining said guard band at the same potential as the output connection to thereby eliminate leakage from the storage means to a point having a different potential.

9. An apparatus as set forth in claim 1 in which said other charging device comprises a charging diode connected between said output connection and said output terminal to assure said voltage level is changed only in said one direction, said apparatus further comprising, another amplifier operatively connected between said output connection and said first-named amplifier, said other amplifier having a high input impedance which prevents discharge of said voltage level storage means, and a guard band surrounding said output connection and being connected to said other amplifier to maintain said guard band at the same potential as the output connection to thereby eliminate leakage from the storage means to a point having a different potential, said other amplifier providing a final output signal of optimum quality.

10. A gaging device comprising a gage head for providing a gaging signal in response to a product characteristic and an electrical apparatus for improving the quality of said gaging signal to provide a precision electrical output signal which is easy to use, said gaging signal having an initial potential voltage which may vary in sign and magnitude, said apparatus comprising, voltage level storage means having an output connection which provides said output signal, an amplifier having said gaging signal supplied thereto and having an output terminal, a first device operatively connected between said output terminal and said output connection and providing only negative charging of said storage means, a second device operatively connected between said output terminal and said input connection and providing only positive charging of said storage means, one of said devices being energized for a predetermined time interval and said other device being energized for a substantially unlimited time interval, said devices being operatively connected within a closed negative feedback loop comprising said amplifier, said devices, and said voltage level storage means together with its output connection, said devices cooperating with said amplifier during said predetermined time interval causing the voltage level at said output connection to be equal to the voltage level of said gaging signal to define an initial voltage condition which is equal in sign and magnitude to said initial potential voltage regardless of its sign and magnitude, said other device cooperating with said amplifier to change the voltage level at said output connection only in one direction from said initial condition in direct proportion to said gaging signal, said apparatus operating to provide said precision output signal at great speed because it always begins operation at the voltage level of said initial potential voltage, and said apparatus operating to store said signal substantially without decay.

11. A gaging device as set forth in claim 10 in which said amplifier has variable gain feedback means operatively connected between said output terminal and an input terminal thereof.

12. A gaging device as set forth in claim 10 in which said voltage level storage means comprises a capacitor exhibiting properties of high internal resistance and a low dielectric absorption coefficient, and said gaging device further comprises another amplifier operatively connected between said output connection and said first-named amplifier, said other amplifier having a high input impedance which prevents discharge of said capacitor, said other amplifier increasing the energy level of said output signal while keeping the precision character thereof substantially intact.

13. A gaging device as set forth in claim 10 in which said first and second devices comprise field effect transistors.

14. A gaging device as set forth in claim 10 in which said other charging device comprises a charging diode connected between said output connection and said output terminal to assure said voltage level is changed only in said one direction, said electrical apparatus further comprising, another amplifier operatively connected between said output connection and said first-named amplifier, said other amplifier having a high input impedance which prevents discharge of said voltage level storage means, and a guard band surrounding said output connection and being connected to said other amplifier to maintain said guard band at the same potential as the output connection to thereby eliminate leakage from the storage means to a point having a different potential, said other amplifier providing a final output signal of optimum quality.

15. An electrical apparatus for storing the positive extreme and the negative extreme of analog input signals and providing a precision differential output signal based on the difference between said extremes, said apparatus comprising, a first voltage level storage means associating with only positive input signals and having a first output connection which provides an intermediate positive signal, a second voltage level storage means associated with only negative input signals and having a second output connection which provides an intermediate negative signal, a first amplifier associating with said first storage means and having positive input signals supplied thereto and having a first output terminal, a second amplifier associating with said second storage means and having negative input signals supplied thereto and having a second output terminal, a pair of positive charging devices each operatively connected between the output terminal and the output connection of each associated amplifier and voltage level storage means and each allowing only positive charging of its storage means, a pair of negative charging devices each operatively connected between the output terminal and the output connection of each associated amplifier and voltage level storage means and each allowing only negative charging of its storage means, said negative charging device associating with the positive storage means and said positive charging device associating with the negative storage means each being energized for a predetermined comparatively short time interval to enable said charging devices cooperating with their associated storage means and amplifiers to change the voltage levels of their respective output connections to be equal in magnitude to the voltage levels of their associated input signals to define an initial voltage condition in each instance, said positive charging device associating with a positive storage means and said negative charging device associating with the negative storage means each cooperating with its associated amplifier subsequent to said predetermined time interval to change the voltage level of the output connection of its associated storage device only to increase the magnitude thereof while maintaining its relative polarity unchanged and thereby provide an associated intermediate signal at great speed and with precision, means for increasing the energy levels of the intermediate signals while keeping the precision character thereof substantially intact to provide positive and negative signals having higher energies, and means for taking the difference between said higher energy positive and negative signals to provide said precision differential output signal.

16. An apparatus as set forth in claim 15 in which said first and second voltage level storage means comprise capacitors each having a high internal resistance and a low dielectric absorption coefficient, and said first and second amplifiers comprise operational amplifiers each having variable gain feedback means operatively connected between its output terminal and an input terminal thereof.

* * * * *